United States Patent

Chiasson et al.

[15] 3,688,180
[45] Aug. 29, 1972

[54] WELDING APPARATUS

[72] Inventors: Wilburt A. Chiasson; Ralph E. Barhorst; Bryce A. Muter, all of Troy, Ohio

[73] Assignee: Hobart Brothers Company, Troy, Ohio

[22] Filed: Jan. 14, 1971

[21] Appl. No.: 106,411

[52] U.S. Cl..............321/21, 219/131 WR, 219/135, 321/2, 321/47
[51] Int. Cl...............................................H02m 7/00
[58] Field of Search....219/131 WR, 135; 321/21, 25

[56] References Cited

UNITED STATES PATENTS

| | | | |
|---|---|---|---|
| 2,757,296 | 7/1956 | Bichsel | 219/131 R X |
| 2,880,374 | 3/1959 | Mulder | 219/131 WR X |
| 2,924,750 | 2/1960 | Mulder | 219/135 X |
| 2,960,626 | 11/1960 | Mulder | 219/135 X |
| 3,242,312 | 3/1966 | Pierce | 219/135 |
| 3,348,130 | 10/1967 | Jensen | 321/20 X |
| 3,475,678 | 10/1969 | Herman et al. | 321/25 X |

*Primary Examiner*—William M. Shoop, Jr.
*Attorney*—Marechal, Biebel, French & Bugg

[57] ABSTRACT

An improved welding power supply includes saturable reactor means in its output to control welding current. A pulse generator is used to control the firing of SCRs which in turn control the average current in the control winding of the reactor and thus the welding current. A unique current sensing circuit provides a feedback voltage to the pulse generator and monitors alternating current, direct current and direct current-reverse polarity welding current without mechanical switching means. The pulse generator is provided with a secondary control circuit which may be used for a limited time to provide higher initial currents to aid in the establishment of the arc. A secondary power supply is also provided which may be connected in parallel with the main power supply to provide a relatively high open circuit voltage to heat the electrode and establish the arc.

3 Claims, 4 Drawing Figures

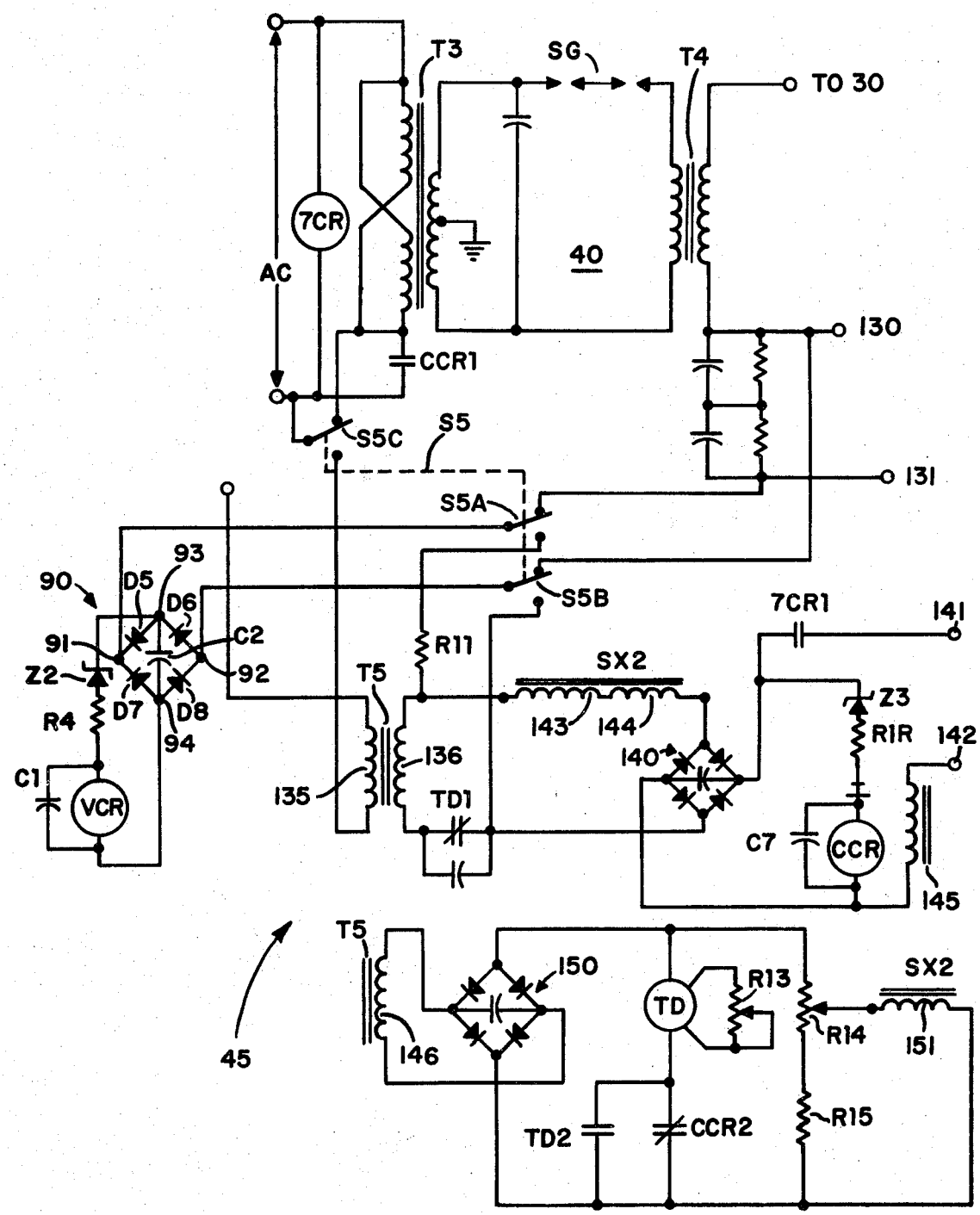

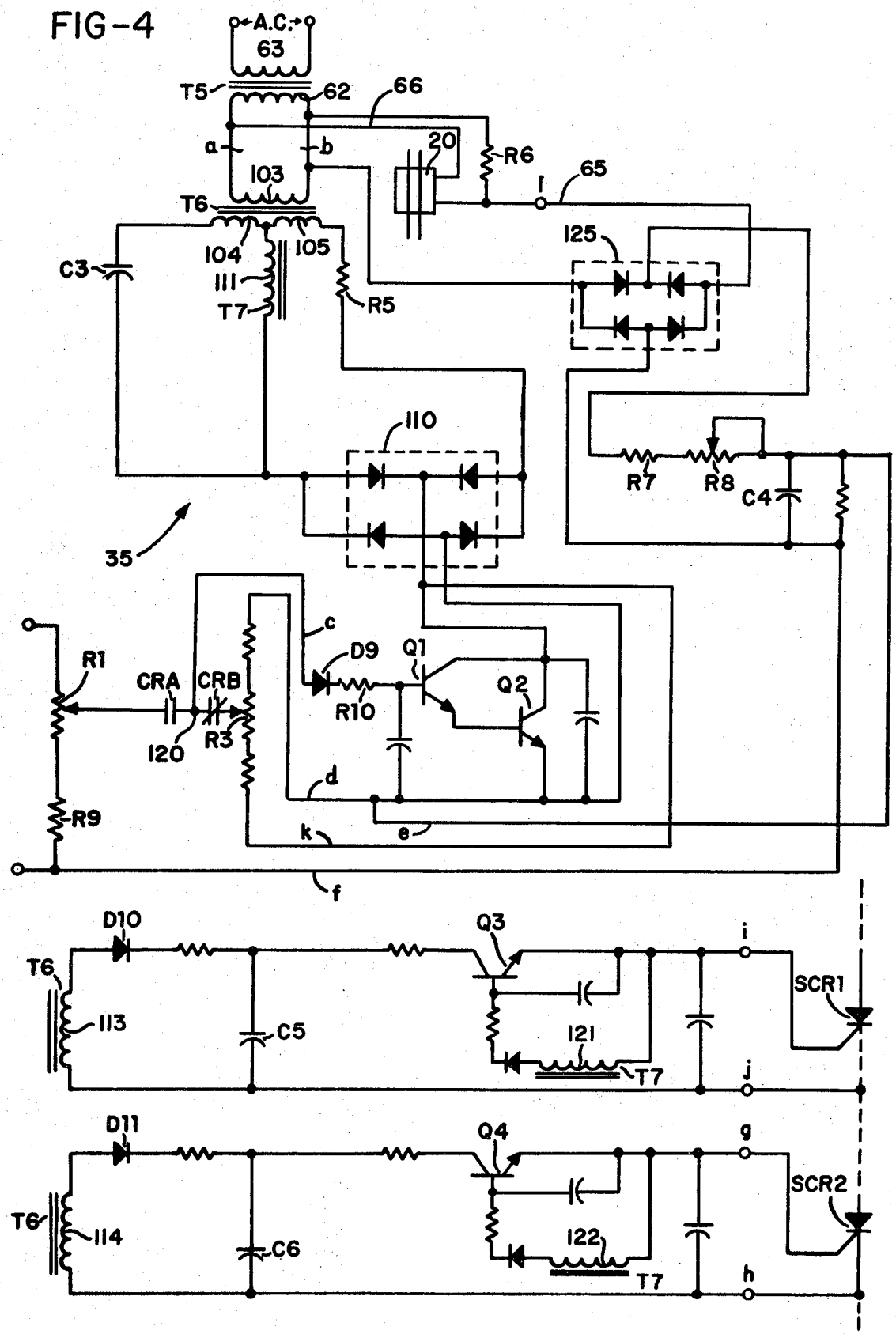

WELDING APPARATUS

BACKGROUND OF THE INVENTION

This invention relates to an improved arc welded power supply which may be used to supply either alternating current, direct current, or direct current-reverse polarity. This invention has particular application to the inert gas metal arc welding process using nonconsumable electrodes, usually tungsten electrodes, commonly referred to as the Tungsten Inert Gas or TIG welding process.

In controlling the current output of the power supply, it is common practice to provide a current to voltage transducer which provides a voltage output proportional to the magnitude of the alternating current supplied to the arc. Due to rectification in the arc, a direct current component of current will exist which may not be detected by these conventional devices. Spitting of the tungsten electrode may therefore result since total welding current is not completely controlled.

It is sometimes desirable to connect a relatively high open circuit voltage source in parallel with the main welding power supply in order to establish the arc initially, particularly when welding with direct current. High frequency power supplies are frequently used to assist in ionizing the gas between the electrode and the part being welded, however, this source of auxiliary power is sometimes insufficient to establish an arc quickly.

SUMMARY OF THE INVENTION

The invention relates to an improved AC/DC welding power supply including saturable reactor means in its output for controlling welding current. The power supply includes a pulse generator for controlling the firing of gate controlled thyristors, preferably silicon controlled rectifiers (SCR) which in turn control the average current in the control windings of the saturable reactor means. A potentiometer, which may be preset by the machine operator, establishes the desired level of welding current by providing a reference input to the pulse generator. Actual welding current is sensed by a current transducer and applied as another input (feedback) to the pulse generator so that the actual welding current will be maintained at the desired level. A high frequency arc starting circuit is included to aid in the establishment of the arc by providing high voltage, low current pulses which are superimposed on the primary winding power supply.

One of the unique features of this invention is in the welding current transducer, which provides a feedback voltage to the pulse generator. AC, DC, and DC-reverse polarity welding currents may be sensed by the same transducer without any mechanical switching means. In addition, this transducer will sense any direct current component of current which may exist when welding with alternating current. Rectifiers are provided to separate the welding current into its direct current components onto conductors which are routed through the current to voltage transducer in such a way tat current flows through the transducer in only one direction regardless of the type of welding current selected by the operator.

The unique feedback circuit of this invention also controls tungsten spitting due to the sensing of the direct current component of the welding current and by generating a control signal which takes into consideration this direct current component.

Another feature of this invention is the use of an auxiliary input to the pulse generator which allows the current inrush of the saturable reactor to produce a surge of welding current at the time the welding arc is established and to control the magnitude of this current through the use of a closed loop feedback circuit. A detector circuit is employed to sense the establishment of the welding arc to disconnect the auxiliary circuit and to return the pulse generator to the control of the primary control circuit.

Another feature of this invention is in the use of an auxiliary power supply which may be connected in parallel with the main power supply to provide a relatively high open circuit voltage to heat the welding electrode so that the welding arc will be established quickly without a large surge of welding current which might damage the part being welded. A timer is included to disconnect this auxiliary power supply after a predetermined time delay has elapsed from the initiation of the arc.

The improved power supply of this invention also includes a detector circuit which may be used with AC, DC, and DC-reverse polarity welding currents to detect the establishment of an arc between the welding electrode and the part being welded.

Accordingly, it is an object of this invention to provide an improved welding power supply of the type described wherein a feedback circuit for a pulse generator includes means for separating the welding current into its direct current components onto individual conductors, a current to voltage transducer for sensing current flow through the individual conductors with the conductors being routed through the transducer in such a way that current flows therethrough in only one direction, and means for recombining the separated direct current components after the current has passed through the transducer; to provide an auxiliary welding control circuit which permits a high level of current to flow to aid in the establishment of the arc with the magnitude of the current being controlled by a separate, closed loop feedback circuit; to provide an improved welding power of the type described which includes an auxiliary power supply which may be connected in parallel with the main power supply to provide a relatively high open circuit voltage in order to aid in the initial establishment of the arc without causing current surges of a magnitude which would otherwise damage the part, the auxiliary power supply being disconnected from the main power supply after a predetermined time delay has elapsed from the initial establishment of the arc; and to provide an improved detector circuit which may be used with either AC, DC, or DC-reverse polarity welding to detect the establishment of a welding arc between the electrode and the part being welded.

Other objects and advantages of the invention will be apparent from the following description, the accompanying drawings and the appended claims.

BRIEF DESCRIPTION OF THE DRAWINGS

FIG. 3 is a schematic diagram showing an auxiliary power supply which may be connected in parallel with the power supply shown in FIG. 2 to provide additional power for limited times to heat the electrode and establish the arc; and FIG. 4 is an electrical schematic diagram of the pulse generator which controls the firing of silicon controlled rectifiers and therefore average current through the control windings of a saturable reactor to control welding current.

DESCRIPTION OF THE PREFERRED EMBODIMENTS

Figure 1:
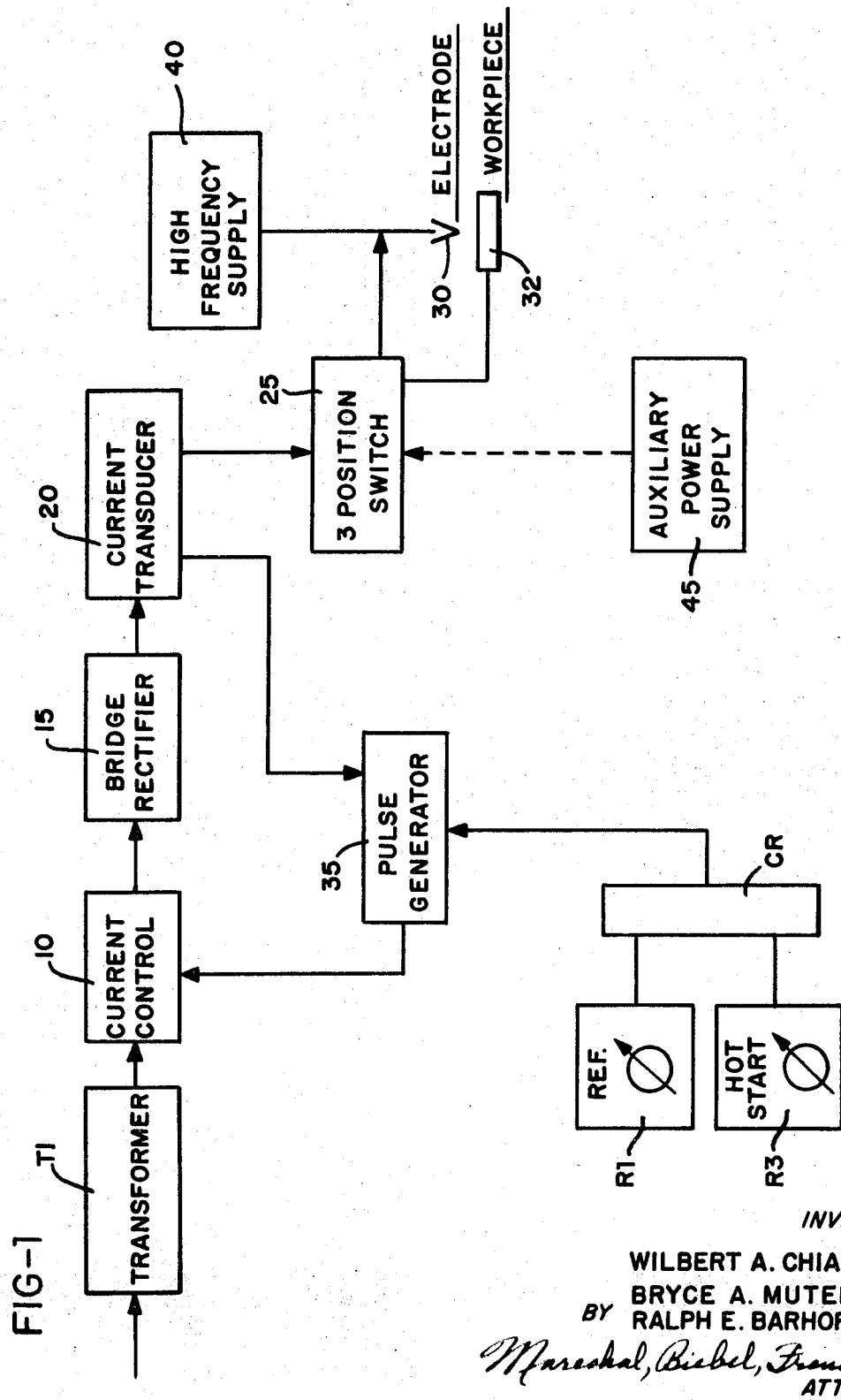
FIG. 1 is a simplified block diagram showing the electrical connections between the component parts of this invention.

Referring now to the drawings which show the preferred embodiments of the invention, and particularly to FIG. 1 where welding power supply of this invention is shown to include a main welding transformer T1 connected to a commercial source of alternating current and its output is connected through a current control circuit 10 to a bridge rectifier circuit 15. This rectifier circuit is used for both AC and DC welding, as will be explained. Current from the rectifier is directed through a current transducer 20 and a three position switch 25 to a welding electrode 30 and workpiece 32. The three position switch 25 selects either alternating current, direct current, or direct current-reverse polarity to be applied to the welding electrode and workpiece. The current transducer 20 supplies a signal to a pulse generator 35 which compares this signal to a voltage from potentiometer R1. The output of the pulse generator 35 is applied to the current control circuit 10 to maintain the magnitude of the welding current at the level preset by the potentiometer.

Also included in the circuit is a high frequency generator 40 which may be used to aid in the establishment of the arc by providing high voltage pulses to assist in ionizing the gas between the electrode and the workpiece. An auxiliary power supply 45 is also provided and may be connected in parallel with the main power supply in order to provide a high open circuit voltage, also to assist in establishing the welding arc.

Figure 2:
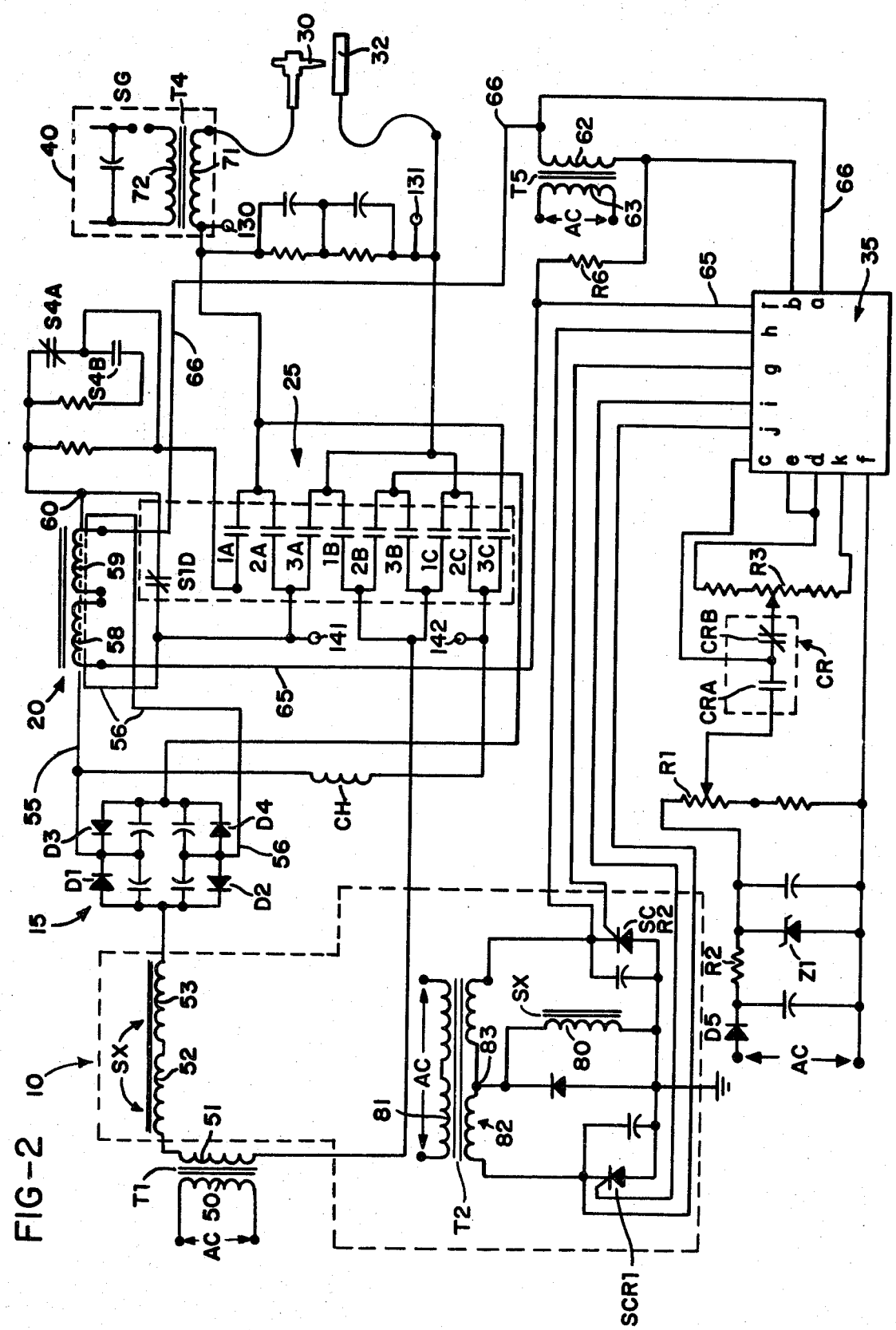
FIG. 2 is a more detailed electrical schematic diagram showing the improved welding power supply of this invention.

Referring now to FIG. 2, the welding transformer T1 has its primary winding 50 connected to a commercial source of alternating current, and one side of the secondary winding 51 is connected to windings 52 and 53 of the saturable reactor SX in the current control circuit 10. As will be explained, reactor SX controls the current intensity to the welding electrode 30.

The output of the saturable reactor SX is connected to bridge rectifier 15 which includes diodes D1–D4. For alternating current welding, diodes D1 and D2 separate the alternating current input into its direct current components on conductors 55 and 56, and these direct current components are directed through the current sensing windings 58 and 59 of current transducer 20 in such a way that current always flows through this transducer in the same direction. These components are then combined at terminal 60, with the current on conductor 56 being directed through switch contacts S1D, and then through switch switch S4A and contacts S1A of the switch 25 to the welding electrode 30.

The current transducer 20 is a saturable reactor, the impedance of which is controllable by the intensity of the magnetic field generated by the current flowing in conductors 55 and 56. The transducer is provided with alternating current exitation from the secondary 62 of transformer T5. Primary winding 63 of T5 is connected to a source of alternating current. The current sensing windings 58 and 59 of transducer 20 are connected in series with each other and are connected by conductors 65 and 66 to the pulse generator 35.

For direct current welding, bridge rectifier 15 acts as a bridge rectifier and current flows through the current transducer 20 on conductor 56 to switch contacts S2A and S3A of the three position switch 25 and then to either the electrode 30 or workpiece 32. Conductor 55 is connected through a filtering choke CH to switch contacts S2C and S3C of the three position switch and then to the other of the electrode 30 or workpiece 32.

Thus, current from the bridge rectifier 15 flows through the current transducer 20 in the same direction, regardless of whether alternating current or direct current welding is to be used, and accomplishes this function without mechanical switching means.

The three position switch 25 allows the operator to select between alternating current, direct current and direct current-reverse polarity. The switch is shown in FIG. 2 in the alternating current mode and therefore switch contacts S1A, S1B, S1C and S1D are closed. For direct current welding, switch contacts S2A, S2B, and S2C will be closed. For direct current-reverse polarity welding, switch contacts S3A, S3B, and S3C will be closed.

Therefore, for alternating current welding, the workpiece 32 is connected through switch contact S1C to one side of the welding transformer 51 while the electrode 30 is connected through switch contact S1A and switch S4A to the other side of the transformer through the diodes D1 and D2 of bridge rectifier 15 and the current controlling reactor SX.

A high frequency generator is included in series with the primary power supply. The high frequency generator includes transformer T4, the second winding 71 of which is connected in series with the welding electrode 30. The primary winding 72 is connected to a power transformer T3 and a spark gap SG. Thus, whenever transformer T3 is energized, high frequency current will be provided and superimposed on the welding current to the electrode which will aid in the establishment of an arc between the electrode and the workpiece.

The magnitude of the welding current is controlled by the current control circuit 10, including saturable reactor SX. The inductance of this reactor may be controlled by regulating the current through its control winding 80, shown at the lower left in FIG. 2. Current through the control winding 80 is provided by transformer T2, the primary winding 81 of which is connected to a conventional source of AC power, and the secondary winding 82 of which includes a center tap 83 connected directly to one side of the control winding. The other side of control winding 80 is connected to the opposite terminals of transformer T2 through silicon controlled rectifiers SCR1 and SCR2. The average current through the control winding 80 is therefore determined by the time during which SCR1 and SCR2 are in the conducting state.

The gate electrodes of SCR1 and SCR2 are connected to the pulse generator 35, and the output of this generator is controlled by a welding current potentiometer R1 and the output from the current transducer 20. Potentiometer R1 is connected to the pulse generator through contacts CRA of relay CR. If the welding current changes from that established by R1, then this change will be sensed by the current transducer and the pulse generator output will change in order to bring the welding current level back to the predetermined level. Potentiometer R1 is connected through resistor R2 and diode D5 to a conventional source of power. Zener diode Z1 provides a regulated voltage across the potentiometer.

This invention also includes means for establishing a higher welding current prior to and as an assist in initiating the welding arc. This is done by providing a second potentiometer R3 which is connected to the pulse generator through the contacts CRB of relay CR and which allows a current inrush of a controlled magnitude to be applied to the electrode and the workpiece. Relay CR is controlled by the voltage across electrode 30 and workpiece 32 and causes control of welding current to return to potentiometer R1 and the arc is established.

In FIG. 3, a voltage sensing relay circuit is shown at the left at 90. This circuit includes terminals 91 and 92 which are connected to the output of the welder power supply through contacts S5A and S5B of switch 55. The normal open circuit voltage of the welding power supply is in the order of 85 volts, but when an arc is established, the voltage between the electrode and the workpiece will decrease to about forty volts with a plasma arc and as low as seven volts with a TIG arc. Therefore, the initiation of the arc may be observed by a reduction in the power supply output voltage.

The circuit shown in FIG. 3 includes bridge rectifier diodes D5, D6, D7 and D8, a Zener diode Z2, and a relay VCR. The diode bridge will allow direct current voltage of either polarity and alternating current voltage to be applied to the input terminals while the voltage across terminals 93 and 94 are always of the same polarity. Resistor R4 limits the voltage on the coil of the relay VCR to approximately 25 volts when 85 volts appears across terminals 91 and 92. Zener diode Z2 acts as a switch and therefore if the voltage across 90 and 91 is less than the Zener voltage, no voltage will appear across the relay coil and the relay will therefore be deenergized. Capacitor C1 prevents erratic operation of the relay while capacitor C2 bypasses any radio frequency voltage which may appear across terminals 91 and 92.

Although not shown, it is to be understood that relay VCR controls the operation of relay CR and therefore controls the input to the pulse generator 35.

FIG. 4 is a detailed electrical schematic diagram of the pulse generator circuit 35 which controls the firing of silicon controlled rectifiers and therefore controls the average current through the control windings of the saturable reactor SX. The pulse generator is provided with a reference voltage from potentiometer R1 and a feedback voltage from the current transducer 20. If the actual current deviates from the current established by the setting of potentiometer R1, then the pulse generator will make a correction for the pulse width of the output to the gates of the SCRs.

The pulse generator receives its power from transformer T5 which has its primary winding 63 connected to a conventional AC source. The secondary winding 62 of T5 is connected to the primary 103 of transformer T6 which has its secondary windings 104 and 105 in a phase shift network including capacitor C3, resistor R5, bridge rectifier 110 and the primary winding 111 of phase shift transformer T7. Transformer T6 also includes two other secondary windings 113 and 114 which supply power to silicon controlled rectifier circuits, as will be explained.

Bridge rectifier 110 functions as a variable resistor and is included in series with resistor R5 on one side of the phase shift network while capacitor C3 functions as the reactance in the other half of the phase shift network. Therefore, the phase shift which appears in transformer T7 as compared to the phase of the voltage of transformer T6 may be controlled by varying the resistance presented by the bridge rectifier 110.

The resistance of the bridge 110 is determined by transistors Q1 and Q2. As the conduction of these transistors increases, the resistance of the diode bridge decreases to decrease the phase shift appearing across transformer T7. Transistor Q1 has its base electrode connected to terminal 120 and may be connected to either potentiometer R1 or R3 through the contacts of relay CR.

The impedance of the current transducer 20 is a function of the welding circuit, and since this device is in series with resistor R6, the voltage across R6 represents welding current. This voltage is rectified by a diode bridge rectifier 125, and the output of this bridge is filtered by capacitor C4 with the amplitude of the signal being controlled by resistors R7 and R8. This feedback voltage is combined with the voltage across R9 and R1 and applied through diode D9 and resistor R10 to the base of transistor Q1 and to the emitter of transistor Q2 and therefore varies the level of conduction of Q2 in accordance with the setting of the adjustable tap of R1 and the actual welding current.

The secondary windings 121 and 122 of phase shift transformer T7 are connected in the emitter to base circuits of transistors Q3 and Q4, respectively, and control the time during which these transistors are gated into the conducting state. The input voltage to these circuits is obtained from the secondary windings 113 and 114 of transformer T6 and are rectified by diodes D10 and D11 and applied across filter capacitors C5 and C6.

Transistors Q3 and Q4 will conduct on alternate half cycles and will gate SCR1 and SCR2 into the conducting state for varying periods of time, as determined by the degree of phase shift in transformer T7.

A "hot start" circuit is also shown in FIG. 4. In this circuit, the input to transistor Q2 is controlled by potentiometer R3 rather than potentiometer R4. This circuit is a closed loop feedback circuit including bridge 110 and potentiometer R3 to control the base of transistor Q1 and thus establish the time during which SCR1 and SCR2 conduct. The inrush of welding current through the welding reactor SX will supply sufficient energy to establish an arc. This current is controlled by the position of the center tap on potentiometer R3 which is adjusted to prevent damage to the tungsten electrode or damage to the part by excessive current. During the operation of this circuit, the current transducer 20 will not control the output of the pulse generator.

When the welding arc is established, control relay CR is energized and the circuit will function under the control of potentiometer R1 in the manner previously described.

The auxiliary power supply or arc booster circuit 45 is shown in FIG. 3. This circuit provides the high voltage and current required to ionize the gas, particularly the helium gas, used in the TIG welding process. The high voltage and low current supplied by the arc booster also heats the thoriated tungsten electrode which then more freely emits electrons.

In FIG. 3, the arc booster circuit is controlled by the triple throw double pole switch S5. As shown, the switch is in the normal position where the arc booster circuit is inoperative. In this position, the voltage sensitive circuit 90 is shown connected across terminals 130 and 131, the output of the welder power supply. Switch contact S5C bypasses relay contacts CCR1 and allows normal operation of the high frequency circuit.

When switch S5 is moved to the position opposite that shown in FIG. 3, power is directed through contacts S5C to connect power to the primary 135 of transformer T5. Also, the voltage sensing circuit 90 is connected across the output of transformer T5 through resistor R11 and relay contact TD1. Resistor R11 is a voltage dropping resistor to prevent the high voltage output of transformer T5 from overdriving the voltage sensing circuit. At this time, relay VCR will be energized through the normally closed contacts TD1 of relay TD.

The output of the secondary winding 136 of transformer T5 is rectified by bridge rectifier 140, and this output will appear across terminals 141 and 142. Contact 2CR will be closed. As shown in FIG. 2, these terminals are parallel to the output of the main power supply and are of the same polarity and will be directed through the contacts of switch 25 to the welding electrode and workpiece for either direct current or direct current-reverse polarity welding. The output current of this power supply is routed through windings 143 and 144 of reactor SX2 and is controlled by that device. A choke 145 is included in series with the output of the rectifier 140 to provide filtering.

The output of bridge rectifier 140 is also applied through Zener Z3 and resistor R12 to relay CCR which will energize. Contacts CCR1 close to provide power to transformer T3 which supplies current to the high voltage transformer T4 and spark gap SG. Contacts CCR2 open at this time to prevent the operation of the time delay relay TD.

When a welding arc is established, the voltage across terminals 141 and 142 will decrease sufficiently to cause deenergization of relay CCR. This relay will deenergize after a slight time delay introduced by capacitor C2 and will open contacts CCR1 to deenergize the high frequency circuit and will close contacts CCR2 to initiate a time delay through relay TD.

When time delay relay TD times out, after a time determined by R13, typically between 0 to .1 seconds, its contacts TD2 will close to hold power on the relay TD and contacts TD1 will open to remove power from the voltage sensing circuit 90 and from terminals 141 and 142. The time delay is to permit the tungsten electrode to heat sufficiently to sustain the arc at a lower voltage and current. Thus, the high voltage will remain in the circuit for a predetermined period of time, as determined by relay TD, and then will be disconnected allowing the welding power supply to operate in the usual manner.

The output of secondary winding 146 of transformer T5 is rectified by bridge rectifier 150 to supply power to relay TD and to a voltage divider network including potentiometer R14 and resistor R15. The center tap of potentiometer R14 is connected to the control winding 151 of saturable reactor SX2 and therefore determines the magnitude of the arc booster current flowing through the secondary winding 136.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for sensing the magnitude of welding current flow including
   rectifier means for separating welding current into its direct current components onto individual conductors;
   a current to voltage transducer for sensing current flowing through said individual conductors, said individual conductors being routed through said current to voltage transducer in such a way that current flows through said transducer in only one direction, the voltage output of said transducer therefore being proportional to any direct current component and instantaneous alternating current flowing therethrough; and
   means for recombining the separated current components by connecting said individual conductors at a point after they have passed through said transducer.

2. The apparatus of claim 1 wherein said current to voltage transducer is a saturable reactor.

3. A power supply for use with the TIG welding process including
   a power transformer;
   current control means connected to the output of said transformer for controlling the average current therethrough;
   rectifier means for separating the alternating current output of said transformer into its direct current components onto individual electrical conductors;
   means for sensing current flow through said individual electrical conductors, said conductors being routed through said current sensing means in such a way that current flows therethrough in only one direction, the output of said current sensing means therefore being proportional to any direct current component and the instantaneous alternating current flow therethrough;
   means for recombining the separated current components and for directing said recombined output to the weld; and
   means connected to said current control means and responsive to the output of said current sensing means and to a reference means for maintaining the output of said transformer at a preselected level.

* * * * *